United States Patent [19]
York

[11] Patent Number: 5,974,161
[45] Date of Patent: *Oct. 26, 1999

[54] DETACHABLE CARD FOR CAPTURING GRAPHICS

[75] Inventor: Dennis Cary York, Corvallis, Oreg.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/609,339

[22] Filed: Mar. 1, 1996

[51] Int. Cl.⁶ ...................................................... G06K 9/00
[52] U.S. Cl. .......................... 382/119; 235/380; 711/115; 710/13
[58] Field of Search ...................................... 711/115, 163, 711/164; 395/282, 280, 283, 497.01, 800, 833, 894, 442; 364/709.01, 709.02, 709.05, 709.06, 709.11, 708.1; 178/18, 18.03, 18.1; 382/119, 187–189, 305, 312–314; 345/905, 156, 179, 173; 361/684–686; 235/379–382; 340/825.34; 902/2, 3; 380/23–25; 710/2, 5, 13, 62, 72–74

[56] References Cited

U.S. PATENT DOCUMENTS

| | | | |
|---|---|---|---|
| 4,752,965 | 6/1988 | Dunkely et al. | 382/3 |
| 4,800,260 | 1/1989 | Simpson-David et al. | 235/487 |
| 4,851,654 | 7/1989 | Nitta | 235/492 |
| 4,912,640 | 3/1990 | Tsugei | 364/400 |
| 4,998,279 | 3/1991 | Weiss | 380/23 |
| 5,180,901 | 1/1993 | Hiramatsu | 235/380 |
| 5,241,303 | 8/1993 | Register et al. | 340/706 |
| 5,264,992 | 11/1993 | Hogdahl et al. | 367/681 |
| 5,355,279 | 10/1994 | Lee et al. | 361/681 |
| 5,365,598 | 11/1994 | Sklarew | 382/315 |
| 5,424,493 | 6/1995 | Sawyer | 178/18 |
| 5,440,502 | 8/1995 | Register | 364/708.1 |
| 5,457,746 | 10/1995 | Dolphin | 380/25 |
| 5,495,586 | 2/1996 | Adachi et al. | 395/280 |
| 5,544,255 | 8/1996 | Smithies et al. | 382/119 |
| 5,559,895 | 9/1996 | Lee et al. | 382/119 |
| 5,587,560 | 12/1996 | Crooks et al. | 382/119 |
| 5,596,562 | 1/1997 | Chen | 395/800 |
| 5,598,487 | 1/1997 | Hacker et al. | 382/313 |
| 5,608,606 | 3/1997 | Blaney | 361/686 |
| 5,613,095 | 3/1997 | Moss et al. | 395/500 |
| 5,619,396 | 4/1997 | Gee et al. | 361/686 |
| 5,629,981 | 5/1997 | Nerlikar | 380/25 |
| 5,630,168 | 5/1997 | Rosebrugh et al. | 382/313 |
| 5,644,705 | 7/1997 | Stanley | 361/685 |
| 5,664,228 | 9/1997 | Mital | 395/280 |
| 5,745,598 | 4/1998 | Shaw et al. | 382/119 |
| 5,812,953 | 9/1998 | Griffith | 455/550 |

Primary Examiner—Leo H. Boudreau
Assistant Examiner—Bhavesh Mehta
Attorney, Agent, or Firm—Curtis G. Rose

[57] ABSTRACT

A signature card is used with a computing system. The card plugs into a host computer and is, for example, a personal computer memory card internal association (PCMCIA) card. The card includes a write-on pad for receiving input from a stylus. A memory stores the input received by the write-on pad. An interface transfers the input stored by the memory to the host computer. The card also includes an independent power source which is independent from the host computer.

20 Claims, 7 Drawing Sheets

DETACHABLE CARD FOR CAPTURING GRAPHICS

BACKGROUND

The present invention concerns computing devices and pertains particularly to a card detachable from a computing system which is capable of capturing graphics such as, for example a handwritten signature.

It is sometimes desirable to capture a graphic, particularly a handwritten signature, into a computer. This is desirable, for example, to verify authenticity of a signature. A verified signature can be used by a computing system for a variety of purposes, for example, to provide security for data.

Various schemes have been used to allow stylus input to be digitized for use in a computing system. See for example, U.S. Pat. No. 5,241,303 issued to David S. Register et al. for Portable Computer with Physical Reconfiguration of Display Connection for Stylus and Keyboard Entry and U.S. Pat. No. 5,440,502 issued to David S. Register for Stylus Operable Computer with Wireless Keyboard in Storage Bay. Additionally there are computing systems which use such digitized input from a stylus for signature verification. See for example, U.S. Pat. No. 4,752,965 issued to Roland A. Dunkley et al. for Sign Verification.

However, generally digitizing pads used for input are either integrated as part of the computing system or, if a peripheral to the computing system, are bulky and must be connected to the computing system when receiving input.

SUMMARY OF THE INVENTION

In accordance with the preferred embodiment of the present invention, there is presented a signature card for use with a computing system. The card plugs into a host computer and is, for example, a personal computer memory card internal association (PCMCIA) card. The card includes a write-on pad for receiving input from a stylus. A memory stores the input received by the write-on pad. An interface transfers the input stored by the memory to the host computer. The card also includes an independent power source which is independent from the host computer.

In the preferred embodiment, for ease of interface with the host system, memory within the card is organized in a standard ATA style format. This allows memory not used for storage of handwritten messages to be available to the portable computer for general storage.

In order to provide an enhanced user interface, the card may include various buttons. These buttons may be implemented, for example, mechanically or with the use of touchpad fields. For example, the card stores within the memory a handwritten message in response to a user depressing an ENTER button. The card clears from memory a handwritten message in response to a user depressing a CLEAR button.

Additional features may also be added to enhance the interface. For example, the card may additionally include a display for displaying input received by the write-on pad.

The present invention allows for efficient entry of signatures and other handwritten graphics into a portable computing system. The solution is very compact and portable. The use of a standard PCMCIA cards allows signature verification to be performed by a variety of personal computers without adding expensive additional peripherals. The greatest anticipated use of the technology of the present invention is to enhance system security, although it is expected that numerous other applications will become apparent.

DESCRIPTION OF THE PREFERRED EMBODIMENT

Figure 1:
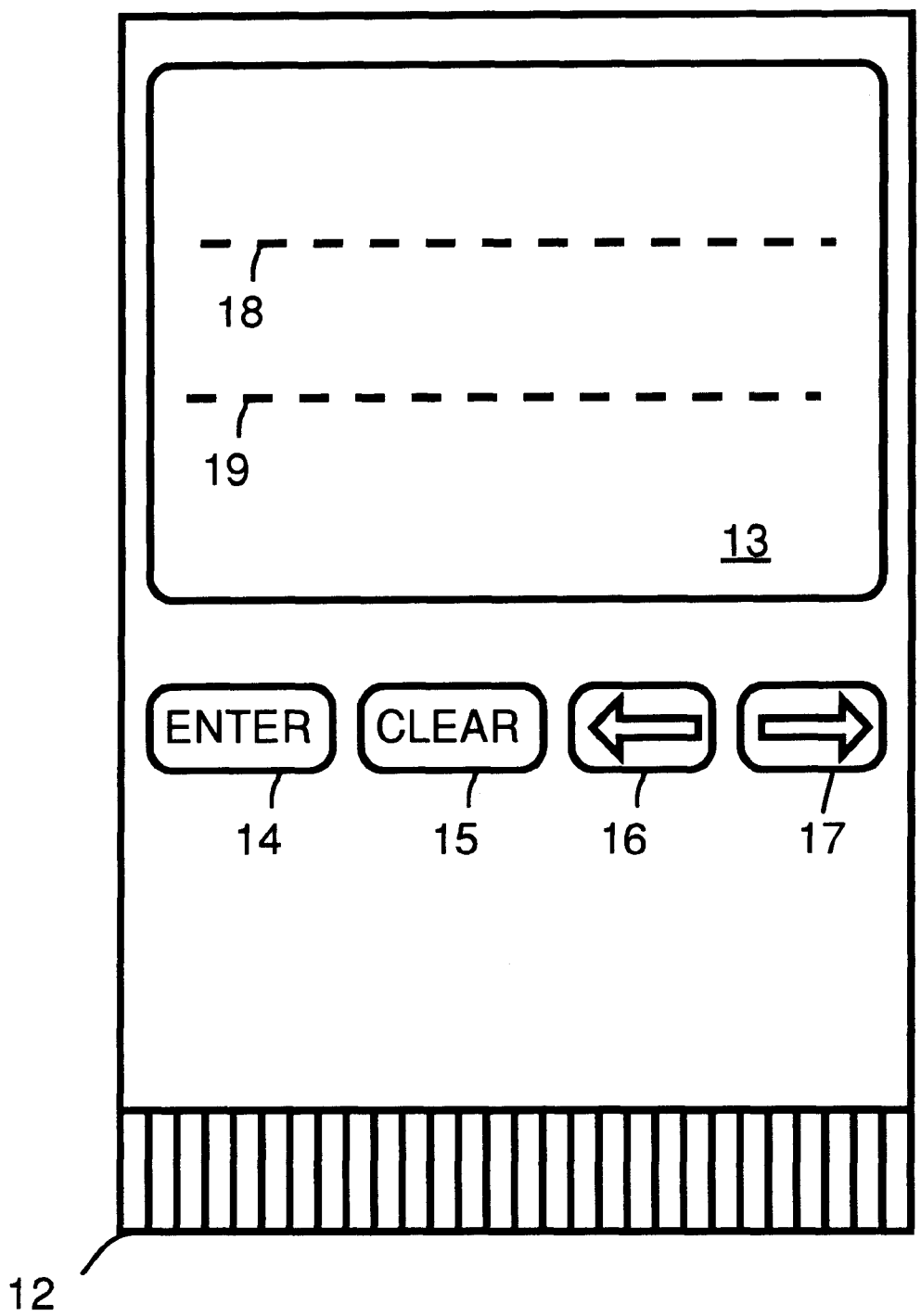
FIG. 1 shows a top view of a PCMCIA card with an interface for receiving graphic input from a writing device in accordance with the preferred embodiment of the present invention.

FIG. 1 shows a top view of a PCMCIA card 12. PCMCIA card 12 includes a write-on pad 13. Shown on write-on pad 13 are a dotted line 18 and a dotted line 19. Dotted lines 18 and 19 are visual aids to a user of PCMCIA card 12 who uses a stylus to write a signature or some other handwritten information on write-on pad 13. Write-on pad 13 is used to digitize the strokes of a pen or stylus. In the preferred embodiment, write-on pad 13 includes a non-stick surface composed of, for example, mylar material, which does not allow ink to stain.

PCMCIA card 12 also includes an ENTER button 14, a CLEAR button 15, a scroll back button 16 and a scroll forward button 17. After a user of PCMCIA card 12 writes a signature or other handwritten message/graphic on write-on pad 13, the user depresses ENTER button 14. To erase a handwritten input without storing it, the user depresses CLEAR button 15. To store additional lines of data or to replace data previously stored, a user uses scroll button 16 to scroll back to a previously stored handwritten input and uses scroll button 17 to scroll forward to a new memory position. Buttons 14, 15, 16 and 17 while shown implemented as physical buttons, may also be implemented, for example, as fields within write-on pad 13, as fields on one or more touchpads separate from write-on pad 13 or as an individual touchpad for each button.

While FIG. 1 shows a four button interface for write-on pad 13, other interfaces may also be used. For example, in a two button interface with just an ENTER button and a CLEAR button, depressing the ENTER button would store a current handwritten input and scroll forward to a new memory position. The user depresses the CLEAR button to erase a current handwritten input without storing it. When a user depresses the CLEAR button twice in quick succession, this results in the current handwritten input being erased and scrolling backward to a previous memory position.

Figure 2:
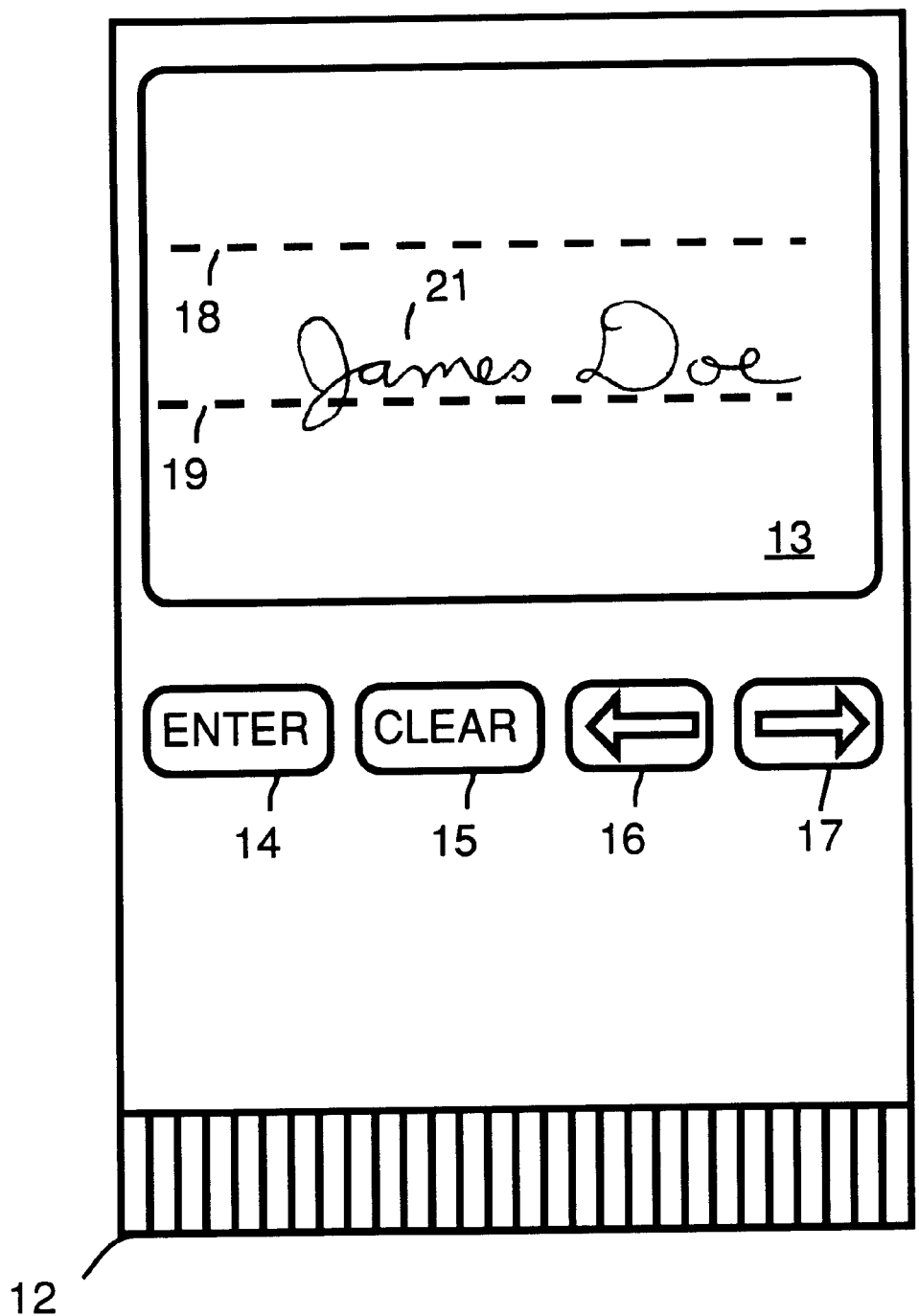
FIG. 2 illustrates handwriting input to the PCMCIA card shown in FIG. 1 in accordance with the preferred embodiment of the present invention.

FIG. 2 illustrates handwriting input to PCMCIA card 12. A user has placed a signature 21 of "James Doe" on line 19.

While in FIG. 2, signature 21 is shown displayed by write-on pad 13, not all embodiments of write-on pad 13 allow for the display of the input to write-on pad 13. The display of signature 21 in FIG. 2 is thus meant to be illustrative of input to write-on pad 13.

Figure 3:
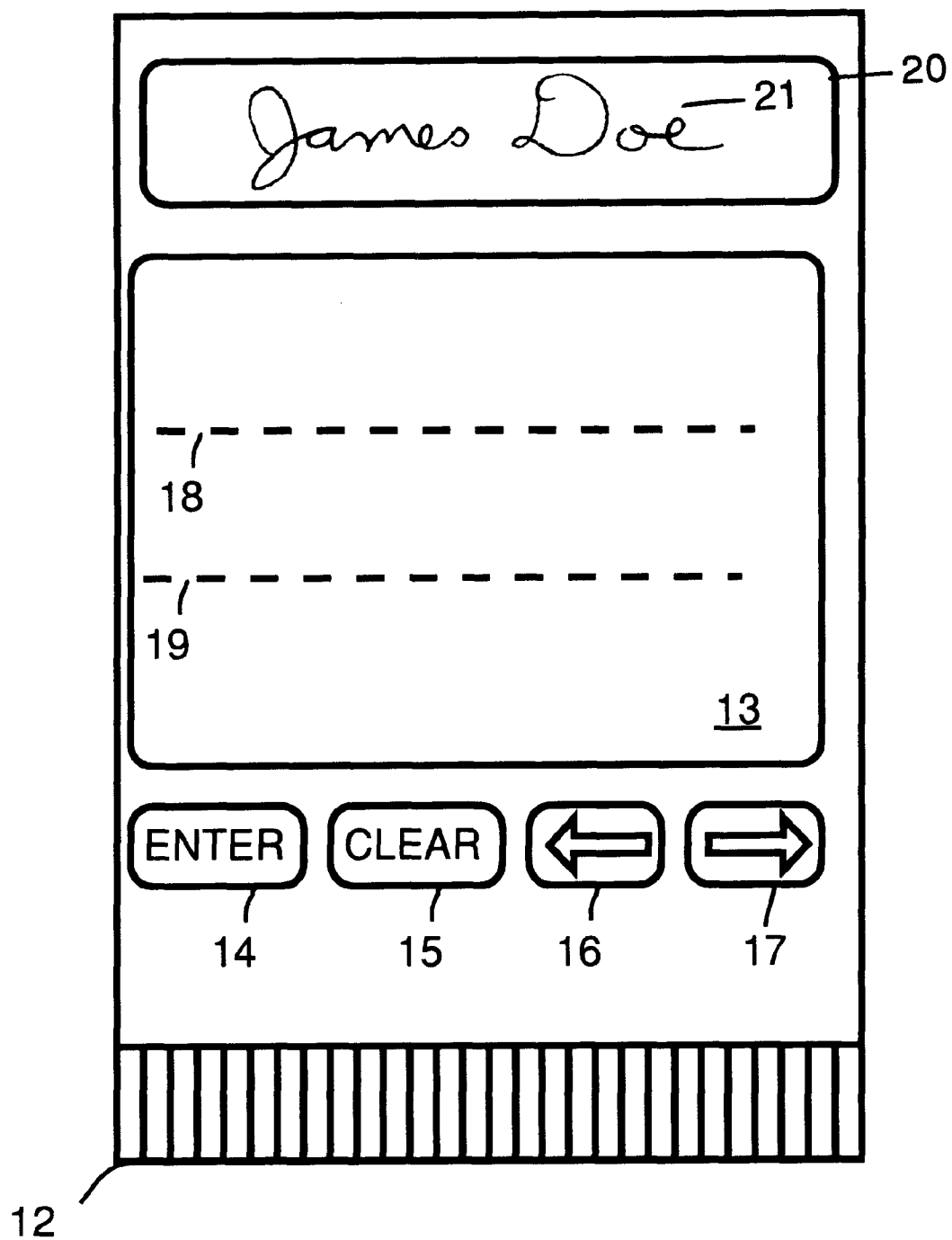
FIG. 3 shows a top view of a PCMCIA card with an interface for receiving graphic input from a writing device which additionally includes a display in accordance with an alternate preferred embodiment of the present invention.

FIG. 3 shows an alternate embodiment of PCMCIA card 12 with the addition of a display 20. For example, display 20 may be a light crystal diode (LCD) display, a liquid crystal display or a display using some other flat panel technology. Display 20 displays handwritten inputs to write-on pad 13. When scrolling to a new/old memory location using scroll button 16 or scroll button 17, display 20 shows any handwritten input contained in the new/old memory location.

Figure 4:
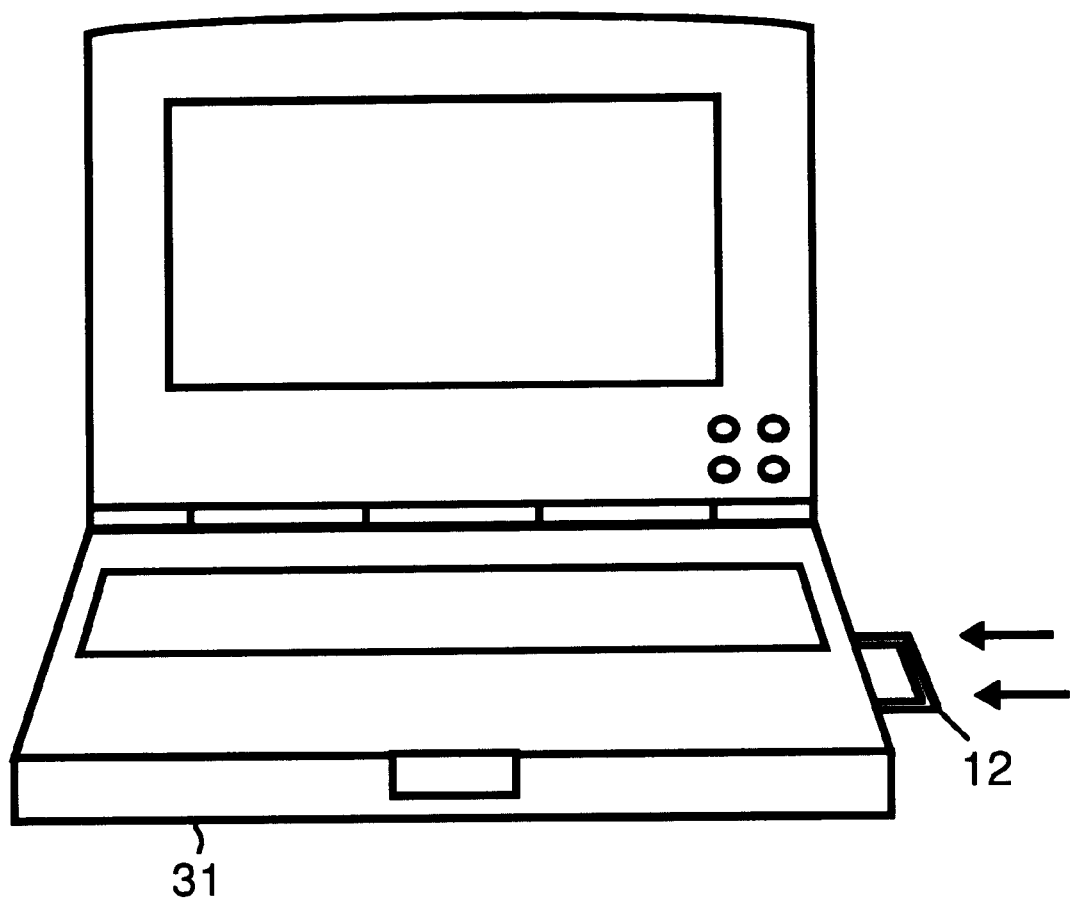
FIG. 4 illustrates placement of the PCMCIA card shown in FIG. 1 into a portable computer in accordance with the preferred embodiment of the present invention.

FIG. 4 illustrates placement of PCMCIA card 12 into a standard PCMCIA slot of a portable computer 31. Portable computer 31 accesses memory locations in PCMCIA card 12 to utilize the handwritten inputs stored by PCMCIA card 12. For example, to analyze signatures stored within PCMCIA card 12, host computer utilizes signature recognition software. In the preferred embodiment, the signature recognition software includes a character module which performs optical character recognition (OCR).

Figure 5:
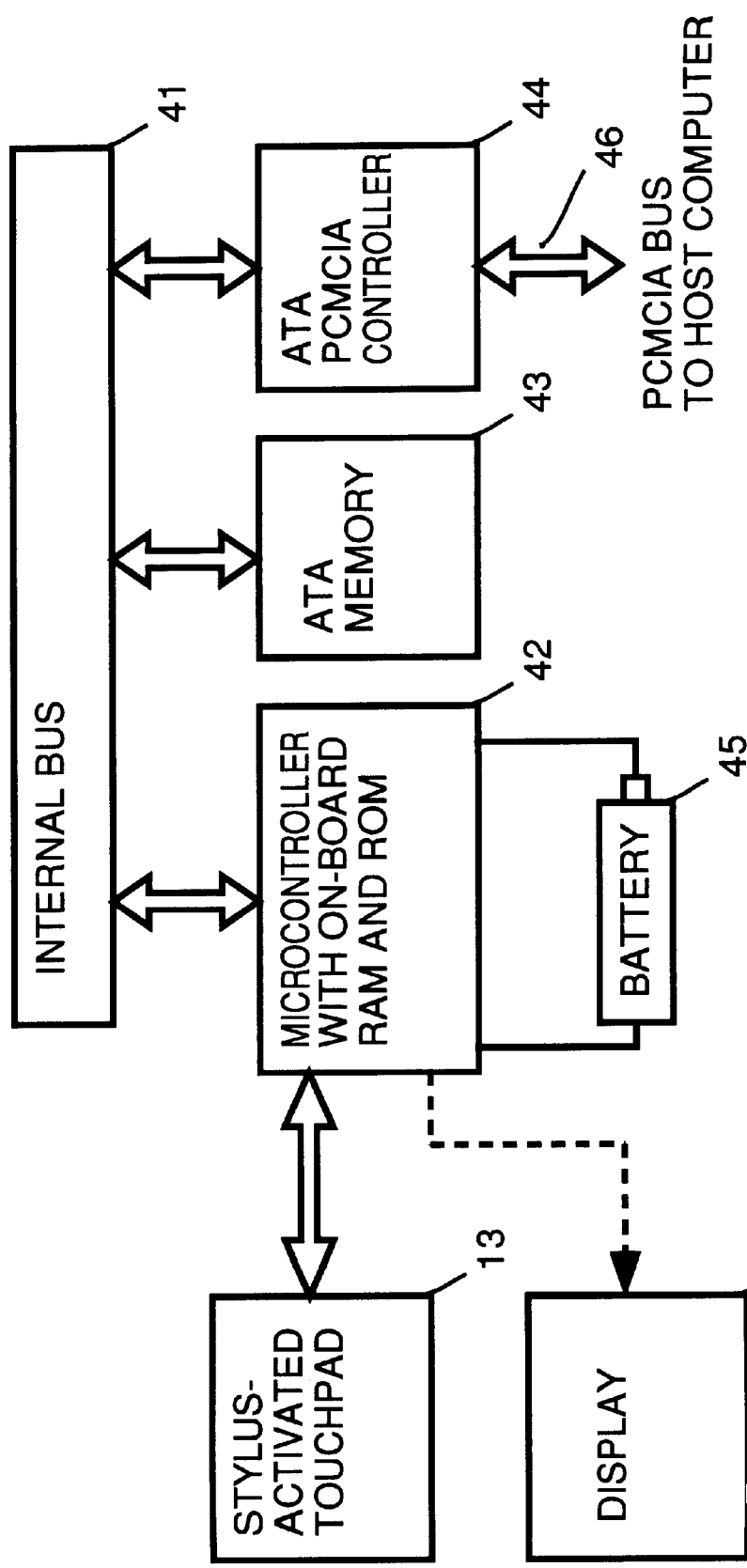
FIG. 5 is a simplified block diagram of logic within the PCMCIA card shown in FIG. 1, in accordance with the preferred embodiment of the present invention.

FIG. 5 is a simplified block diagram of logic within the PCMCIA card 12. A microcontroller 42 is used to control write-on pad 13. In addition, microcontroller 42 is used to control display 20, if display 20 is present. Microcontroller 42 is implemented using an 8051 microcontroller available from Intel Corporation having a business address of 1781 Fox Drive, San Jose Calif. 95131. Microcontroller 42 has, for example, 128 bytes of on-board random access memory (RAM) and 4 K bytes of on-board read-only memory (ROM). Microcontroller 42 is powered using battery 45. For example, battery is a Panasonic CF2032 three volt battery.

Using an internal bus 41, microcontroller 42 communicates with memory 43 and an advanced technology attachment (ATA) PCMCIA controller 44. Internal bus 41, for example operates as an 8051 bus.

Memory 43 is, for example, configured as a ATA-style mass storage memory which includes 1 to 80 megabytes of flash or RAM memory, depending on the application. For example, 1 megabyte of memory is sufficient when PCMCIA card 12 is devoted to signature analysis. When PCMCIA card 12 is also used for storage, memory 43 can be used to hold 80 megabytes or more, as desirable.

The advantage of configuring memory 43 in ATA format is that this is a standard format for both electromechanical and semiconductor PCMCIA disk drives. When microcontroller 42 places handwritten inputs in memory 43, microcontroller puts them in a standard graphics file format. For example, microcontroller 42 places handwritten inputs in memory 43 within Windows bit map (BMP) files or within personal computer exchange (PCX) files. The files are stored within memory 43 using a standard disk operating system (OS) pointer or a file allocation table (FAT) system. This allows the host system, for example portable computer 31, to access the handwritten inputs stored within PCMCIA card 12 without special drivers of any kind.

Additional advantages of the use of ATA format is that the host computer can store a configuration file for microcontroller 42 by storing a file in memory 43 within a special predetermined name (e.g., config.mc) which microcontroller 42 recognizes. The configuration file is used, for example, to set up special fields on PCMCIA card 12. Additionally, memory locations within memory 43 not used for storing handwritten inputs or a configuration file is made available to the host computer for additional storage of data.

ATA PCMCIA controller 44 provides an interface between PCMCIA card 12 and the host computer. When PCMCIA card 12 is connected to the host system, PCMCIA controller 44 communicates with the host computer through a standard PCMCIA bus 46. For example, PCMCIA controller 44 is implemented using an PCM 16C02 controller available from National Semiconductor.

Figure 6:
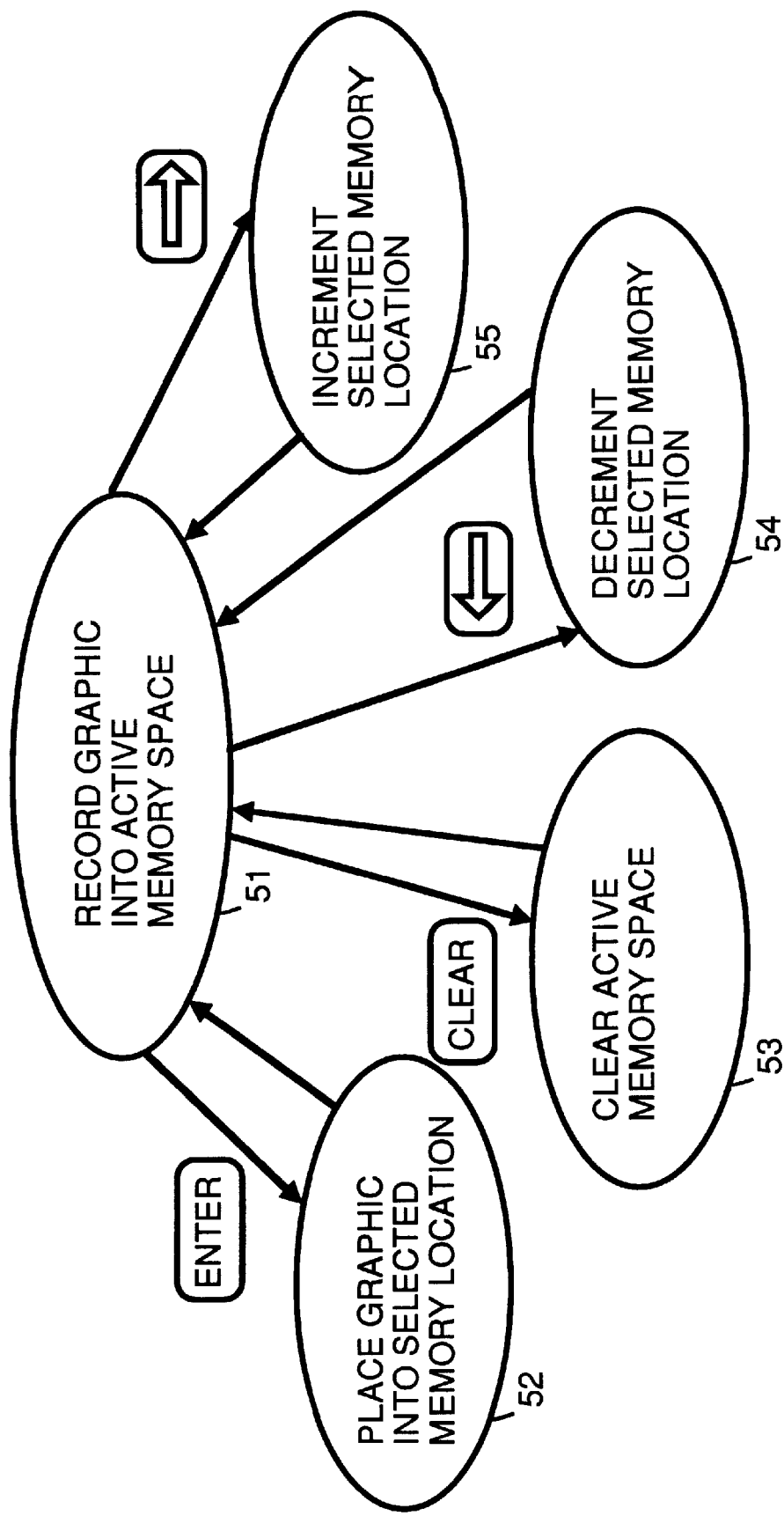
FIG. 6 is a simplified state diagram which illustrates operation of a microcontroller within the simplified block diagram of logic shown in FIG. 4, in accordance with the preferred embodiment of the present invention.

FIG. 6 is a state diagram which illustrates operation of microcontroller 42. As illustrated by state 51, after start-up, when active, microcontroller 42 records a graphic drawn on a write-on pad into an active memory space, for example within onboard RAM within microcontroller 42. As illustrated by state 52, upon a user depressing ENTER button 14, microcontroller 42 places the graphic in its active memory space into a selected memory location (file) within memory 43. Microcontroller 42 then returns to state 51.

As illustrated by state 53, upon a user depressing CLEAR button 15, microcontroller 42 clears its active memory space. Microcontroller 42 then returns to state 51. As illustrated by state 54, upon a user depressing scroll button 16, microcontroller 42 decrements the selected memory location (file). Microcontroller 42 then returns to state 51. As illustrated by state 55, upon a user depressing scroll button 17, microcontroller 42 increments the selected memory location (file). Microcontroller 42 then returns to state 51.

Figure 7:
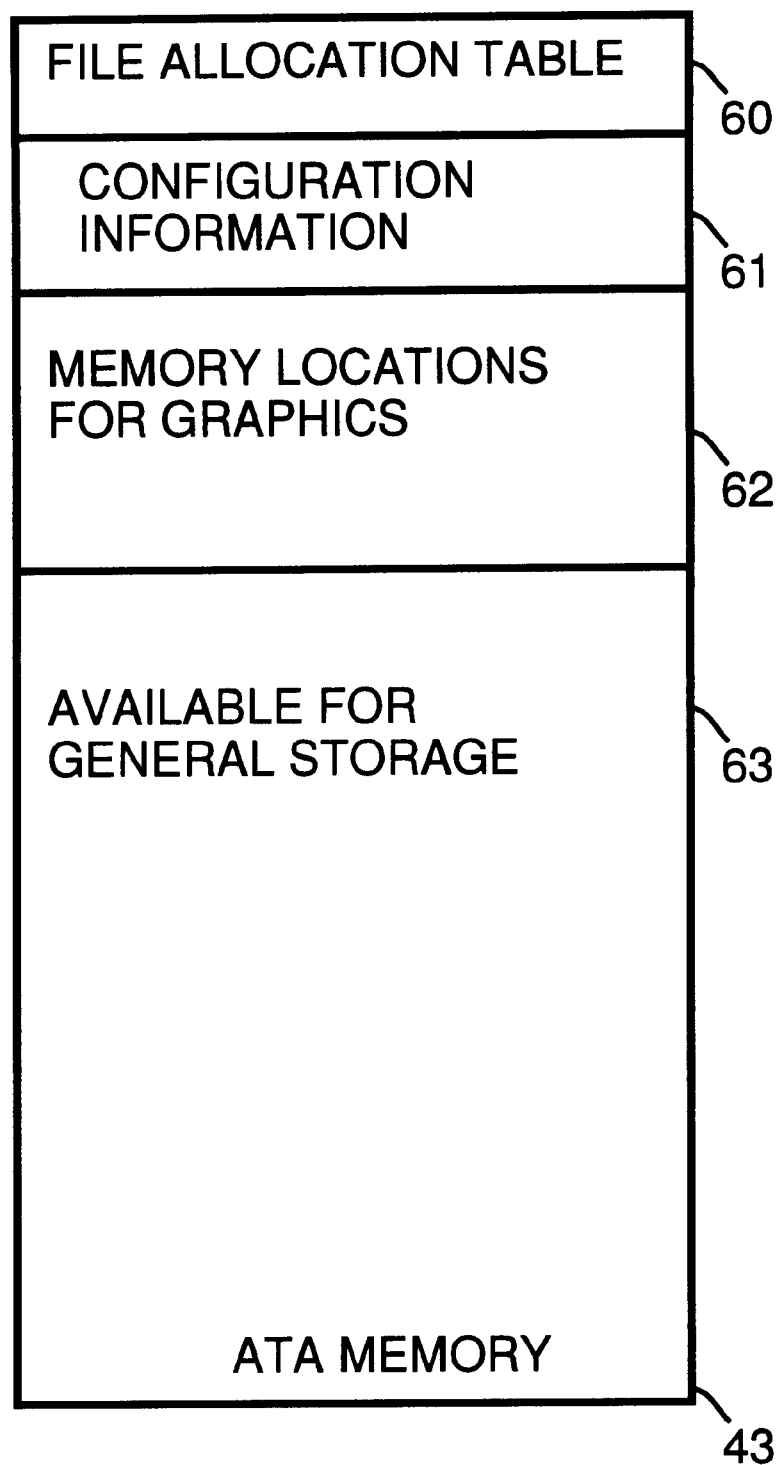
FIG. 7 is a simplified diagram illustrating organization of memory within the PCMCIA card shown in FIG. 1, in accordance with the preferred embodiment of the present invention.

FIG. 7 is a simplified diagram illustrating organization of memory 43.

Within memory 43, a portion 60 is used to store a file allocation table. Within memory 43, a portion 61 is used to store configuration information. For example, configuration information is stored in a single file utilizing a few hundred bytes of storage space. A portion 62 of memory 43 is used to store graphics files which have handwritten inputs. For example, portion 62 includes as many files as desirable, each containing as many bytes of data as needed. A portion 63 of memory 43 may be used for general storage by the host computer. For example, portion 62 may include 2 megabytes of data and portion 63 may include 78 megabytes of data.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A secured computer system comprising:

a host computer; and a system security card which plugs into the host computer, the system security card comprising, a write-on pad for receiving a graphical input from a stylus, memory for storing the graphical input received by the write-on pad, an interface for transferring the graphical input stored by the memory to the host computer, an independent power source which is independent from the host computer, and the host computer further comprising verification means for analyzing the graphical input to provide security for the secured host computer.

2. A secured computer system as in claim 1 wherein the memory of the system security card is organized in a standard ATA style format.

3. A secured computer system as in claim 1 wherein the system security card additionally comprises:

a display for displaying the graphical input received by the write-on pad.

4. A secured computer system as in claim 1 wherein the system security card is a personal computer memory card internal association (PCMCIA) card.

5. A secured computer system as in claim 1 wherein the system security card additionally comprises:

a first button; and a controller for controlling the write-on pad, the controller, responsive to a user depressing the first button, storing the graphical input from the stylus within the memory.

6. A secured computer system as in claim 5 wherein the system security card additionally comprises:

a second button, the controller, responsive to the user depressing the second button, clearing from the memory the graphical input.

7. A secured computer system as in claim 1 wherein the graphical input is a handwritten input.

8. A secured computer system as in claim 1 wherein the graphical input is a handwritten signature.

9. A personal computer memory card internal association (PCMCIA) system security card comprising:

a write-on pad for receiving a graphical input from a stylus, wherein the graphical input can be analyzed by the host computing system to provide security for the host computing system;

memory for storing the graphical input received by the write-on pad;

a PCMCIA interface for transferring the graphical input stored by the memory to a host computing system; and, an independent power source which is independent from the host computing system.

10. A PCMCIA system security card as in claim 9 wherein the memory is organized in a standard ATA style format.

11. A PCMCIA system security card as in claim 9 wherein the host computing system is a portable computer.

12. A PCMCIA system security card as in claim 9 additionally comprising:

a display for displaying the graphical input received by the write-on pad.

13. A PCMCIA system security card as in claim 9 additionally comprising:

a first button; and a controller for controlling the write-on pad, the controller, responsive to a user depressing the first button, storing the graphical input from the stylus within the memory.

14. A PCMCIA system security card as in claim 13 additionally comprising:

a second button, the controller, responsive to the user depressing the second button, clearing from the memory the graphical input.

15. A PCMCIA system security card as in claim 9 wherein the graphical input is a handwritten input.

16. A PCMCIA system security card as in claim 9 wherein the graphical input is a handwritten signature.

17. A method for securing a computing system using signature verification comprising the steps of:

(a) providing a write-on pad on a system security card, the system security card being separable from the computing system, and the system security card having an independent power supply;

(b) recording, by the system security card, a signature input to the write-on pad by a user;

(c) after the system security card is plugged into the computing system, transferring the signature to the computing system; and, (d) the computing system verifying the signature input to provide security for the computing system.

18. A method as in claim 17 wherein the computing system is a laptop computer and the system security card is a personal computer memory card internal association (PCMCIA) card.

19. A method as in claim 18 wherein in step (b) the signature is stored in an ATA-style memory within the PCMCIA card.

20. A method as in claim 19 wherein step (b) includes the following substeps:

(b.1) temporarily storing the signature as the user inputs the signature on the write-on pad with a stylus;

(b.2) in response to the user depressing an ENTER button on the PCMCIA card, storing the signature in the ATA-style memory.

* * * * *